No. 780,744. PATENTED JAN. 24, 1905.
J. M. DIX.
CEMENT COATED NAIL.
APPLICATION FILED OCT. 6, 1902.

WITNESSES:
J. E. R. Hayes
Saul Lipperstein

INVENTOR:
Joseph M. Dix
by his attys
Clarke & Raymond

No. 780,744. Patented January 24, 1905.

UNITED STATES PATENT OFFICE.

JOSEPH M. DIX, OF FOXBORO, MASSACHUSETTS.

CEMENT-COATED NAIL.

SPECIFICATION forming part of Letters Patent No. 780,744, dated January 24, 1905.

Application filed October 6, 1902. Serial No. 126,088.

*To all whom it may concern:*

Be it known that I, JOSEPH M. DIX, a citizen of the United States, and a resident of Foxboro, in the county of Norfolk and State of Massachusetts, have invented a new and useful Improvement in Cement-Coated Nails, of which the following is a full, clear, and exact description, reference being had to the accompanying drawings, forming a part of this specification, in explaining its nature.

My invention relates to what is known in the trade as "cement-coated nails."

A cement-coated nail comprises a nail coated throughout its length with some tough adhesive substance or composition so sensitive to heat that it becomes somewhat softened by the heat of friction occasioned by driving the nail, but only to become set again when the nail has been driven home, when it adheres not only to the nail, but also to the surrounding fiber of the material into which the nail has been driven, and holds the nail practically cemented in place. Another advantage arising from the use of the cement-coated nail is that the substance or substances composing the cement coating act to protect the nail and keep it from rusting or other deterioration incident to dampness or moisture. It also acts as a preservative for the wood or like fiber into which the nail has been driven.

My invention comprises, therefore, a cement-coated nail having a superior kind of cement coating, in the fact that the cement responds readily to the heat incident to driving the nail, as is required in such cements, and is possessed of superior adhesive properties, whereby it better adheres to the fiber into which the nail has been driven, and so holds the nail in place with greater tenacity.

Figure 1:
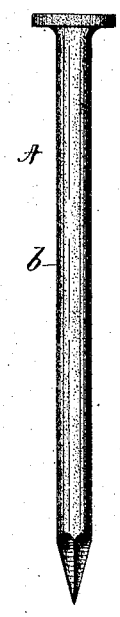
Figure 2:
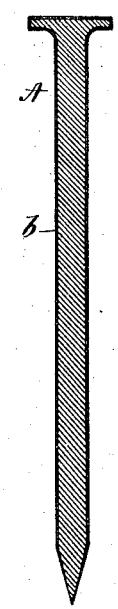

Referring to the drawings, Figure 1 shows a nail having the cement coating. Fig. 2 shows the same in vertical cross-section.

A represents a nail having the cement coating b. The nail may be of any kind; but preferably the coating is applied to what is commercially known as a "wire" nail.

The cement in its perfected state forming the coating for the nail consists of a mixture of rosin, turpentine, and japan.

The normal brittle characteristics of rosin would render it wholly inadequate for the purpose to which it is put unless toughened and made more glutinous. These properties are obtained, first, by melting the rosin or reducing it to a liquid state, when it is preferably thinned by adding turpentine, and I have found by experience that a proper consistency of the rosin is obtained by adding approximately one pound of turpentine to four pounds of rosin. This is then heated to a certain degree less than a boiling temperature, when common commercial japan is added, making the whole about as thick as very thin molasses. About one pound of japan added to the mixture in the proportions before given give about the right consistency. The cement mixture is now ready for application to the nails for which it is to serve as a coating. This is done by raising the temperature of the cement to approximately 235° Fahrenheit, when the nails which have been heated to a correspondingly approximate temperature are dipped in it. The final step in the process consists in baking the nails, with their viscous covering, in a temperature ranging from approximately 200° to 250°, when the nails are left, as may be seen by reference to Fig. 2 of the drawings, with a thin cement coating or shell b and are then ready for use.

The turpentine which forms one ingredient of my cement composition is added, as before explained, in order that the melted rosin may be so thinned that with the turpentine added thereto the resultant mixture may be applied to the nail with a thin smooth coating. While some other dissolvent might be used, in so far as the scope of my invention is concerned, yet turpentine is perhaps the best dissolvent, for the reason that it acts also as a temporary liquefier or dissolvent and a large part of the turpentine after the mixture has been applied to the nail is dissipated by evaporation.

Having thus fully described my invention, I claim and desire to secure by Letters Patent of the United States—

1. As an article of manufacture, a cement-coated nail having a cement coating consisting of substantially one part turpentine, one part japan to four parts rosin combined in substantially the manner indicated.

2. As an article of manufacture, a cement-coated nail the composition of which cement coating comprises rosin, a dissolvent therefor and japan.

3. As an article of manufacture, a cement-coated nail the composition of which cement coating comprises rosin, a temporary liquefier therefor and japan.

4. As an article of manufacture, a cement-coated nail the composition of which cement coating comprises rosin and japan.

JOSEPH M. DIX.

Witnesses:
  J. E. R. HAYES,
  SAUL SIPPERSTEIN.